May 8, 1923.
E. KNAPP ET AL
1,454,747
APPARATUS FOR MANUFACTURING FLOWERS OF SULPHUR
Filed May 2, 1922
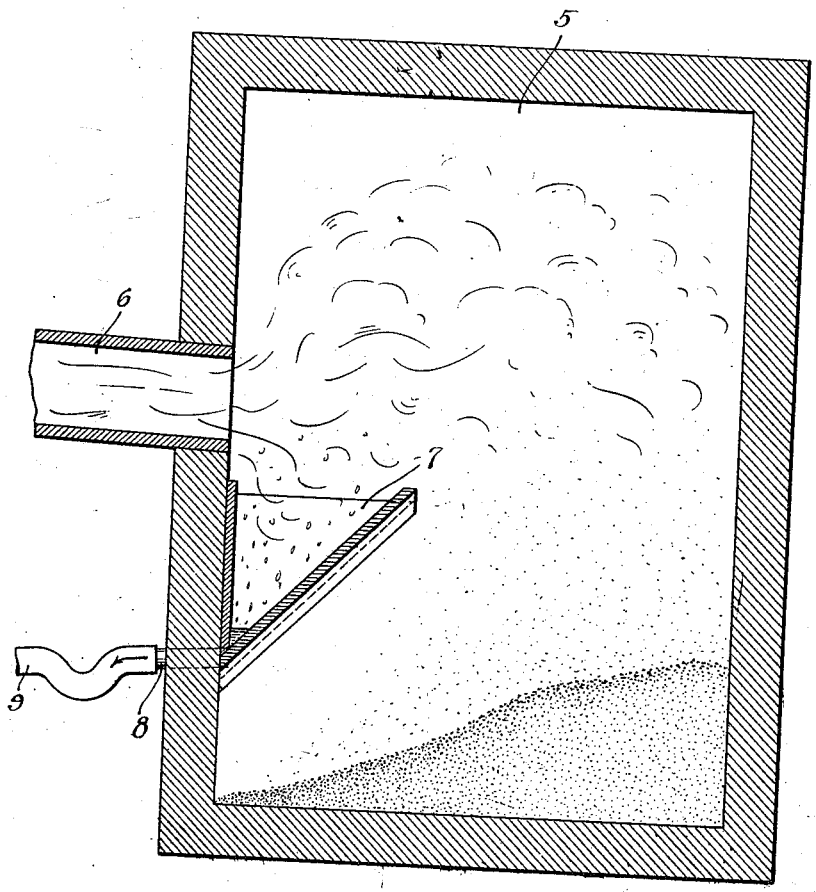
WITNESSES
Frederick Diehl.
P. H. Pattison.
INVENTORS
E. KNAPP
J. K. DICKERSON
F. L. BEGTRUP
BY
ATTORNEYS Patented May 8, 1923.

1,454,747

UNITED STATES PATENT OFFICE.

EDGAR KNAPP AND JOHN KARL DICKERSON, OF MIDDLEPORT, NEW YORK, AND FREDERIK L. BEGTRUP, OF LOUISVILLE, KENTUCKY, ASSIGNORS TO NIAGARA SPRAYER CO., OF MIDDLEPORT, NEW YORK, A CORPORATION OF NEW YORK.

APPARATUS FOR MANUFACTURING FLOWERS OF SULPHUR.

Application filed May 2, 1922. Serial No. 558,027.

*To all whom it may concern:*

Be it known that we, EDGAR KNAPP and JOHN KARL DICKERSON, both citizens of the United States, and residents of Middleport, in the county of Niagara and State of New York, and FREDERIK L. BEGTRUP, a citizen of Denmark, and resident of Louisville, in the county of Jefferson and State of Kentucky, have invented a new and Improved Apparatus for Manufacturing Flowers of Sulphur, of which the following is a full, clear, and exact description.

The present invention relates to new and useful improvements in apparatus for the manufacture of flowers of sulphur, and it pertains more particularly to a condensing chamber into which the vapors of sulphur are led and condensed to finely divided powdered sulphur, which latter is commonly known in the art as "flowers of sulphur." It has been found in actual practice that when the vapors of sulphur from the retort are introduced into the condensing chamber, liquid sulphur is formed at that point in the chamber which is the hottest and which has been found to be the point of introduction. Inasmuch as these chambers are formed from metal, brick and like materials, certain parts whereof have a tendency to retain heat, that portion of the sulphur vapor which contacts with these parts, is transformed into liquid sulphur, and which if permitted to mingle with the flowers of sulphur formed within the chamber, forms relatively large lumps of sulphur within the flowers of sulphur.

It is one of the objects of the present invention to so construct the condensing chamber that the liquid sulphur may be separated and maintained at all times separate from the flowers of sulphur formed within the chamber.

It is a further object of the invention to so construct the condensing chamber that the means for collecting the liquid sulphur will be located at the point where said liquid sulphur is formed.

It is a still further object of the invention to provide means whereby the liquid sulphur may be conveyed from the condensing chamber as it is formed.

With the above and other objects in view, reference is had to the accompanying drawings, in which the figure is a sectional view of a condensing chamber constructed in accordance with the present invention.

Referring more specifically to the drawings, the device comprises a chamber 5, which although shown in the present instance as rectangular in form, may be of any desired shape. Leading into the chamber 5 is a pipe 6, which pipe connects the chamber with a retort (not shown). This pipe 6 leads into the chamber at a slight angle as shown in the drawings, for a purpose to be hereinafter described.

Mounted within the chamber 5 and carried preferably by the side wall through which the pipe 6 enters, is a trough or similar structure 7, and leading from the trough 7, is a pipe 8, to which a drain pipe 9 is connected. This trough 7 is arranged at a slight incline relative to the wall on which it is secured, in order that one end may be lower than the other to provide for the liquid sulphur draining from the high end to the low end, it being understood that the pipe 8 is connected to the trough at its low end.

The device operates in the following manner:

The sulphur vapors are led to the interior of the chamber 5 by the pipe 6, and as they strike the cooler atmosphere within the chamber 5, they are condensed to small particles of sulphur, commonly known in the art as "flowers of sulphur." Owing to the fact that the point at which the pipe 6 leads into the chamber 5, is the hottest point therein, the vapors at this point transform to liquid sulphur, and in the present instance as this liquid sulphur is formed, it falls into the trough 7 from which it is drained by means of the pipes 8 and 9, the trough being inclined in order that the liquid sulphur will flow to the pipes 8 and 9 as hereinbefore stated. Owing to the incline of the pipe 6, any liquid sulphur which may be formed therein, will be drained therefrom and be deposited in the trough 7.

From the foregoing it is apparent that the present invention provides an apparatus for condensing sulphur vapors to "flowers of sulphur," and, at the same time, said apparatus serves to prevent the intermingling of liquid sulphur and "flowers of sulphur"

when said liquid sulphur is formed. Furthermore, this collecting means of the liquid sulphur serves to return the same to the retort or other suitable means.

We claim:

1. A device of the character described comprising a chamber, means for introducing sulphur vapors thereto, and means for collecting the liquid sulphur, said liquid-sulphur-collecting means being located within the chamber at a point adjacent that point at which the sulphur vapors are introduced.

2. A device of the character described comprising a chamber, means for introducing sulphur vapors thereto, said means comprising an inclined pipe leading into the chamber, and means located adjacent said pipe for collecting liquid sulphur and conveying the same from the chamber.

3. A device of the character described comprising a chamber, means for introducing sulphur vapors thereinto, and a trough arranged adjacent said vapor-introducing means, said trough adapted to collect liquid sulphur formed at the point of introduction of the vapors.

4. In a device of the character described, a condensing chamber for condensing sulphur vapors to form flowers of sulphur, and means for collecting liquid sulphur from the vapors to prevent its intermingling with the formed flowers of sulphur, substantially as described.

5. A device of the character described comprising a chamber, means for introducing sulphur vapors thereto, means located adjacent the point of introduction of said sulphur vapors for collecting liquid sulphur which may be contained in said sulphur vapors, and means associated with said collecting means for conveying the collected liquid sulphur from the chamber.

6. A device of the character described comprising a chamber, means for introducing sulphur vapors thereto, and means for collecting the liquid sulphur contained in said sulphur vapors, said liquid sulphur collecting means comprising a trough carried by one of the side walls of said chamber adjacent the point of introduction of said sulphur gases.

7. A device of the character described comprising a chamber, means for introducing sulphur vapors to said chamber, and means for collecting the liquid sulphur contained in said sulphur vapors, said means comprising a trough carried by one of the side walls of said chamber and adjacent the point of introduction of the sulphur gases and in spaced relation with the bottom wall of said chamber.

8. A device of the character described comprising a chamber, means for introducing sulphur gases into said chamber, and means arranged within said chamber and in the path of the gases entering said chamber for collecting any liquid sulphur that may be present in said sulphur gases.

9. A device of the character described comprising a chamber, means for introducing sulphur gases into said chamber, and means arranged in the chamber and in the path of precipitable matter contained within said gases for the purpose of collecting said precipitable matter, said collecting means being spaced with respect to the bottom wall of said receptacle.

EDGAR KNAPP.
JOHN KARL DICKERSON.
FREDERIK L. BEGTRUP.